(12) United States Patent
Sugaya

(10) Patent No.: US 11,457,150 B2
(45) Date of Patent: Sep. 27, 2022

(54) ELECTRONIC DEVICE CAPABLE OF PERFORMING CONTROL BASED ON A TOUCH OPERATION AND CONTROL METHOD THEREOF

(71) Applicant: CANON KABUSHIKI KAISHA, Tokyo (JP)

(72) Inventor: Kazuki Sugaya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 219 days.

(21) Appl. No.: 16/897,721

(22) Filed: Jun. 10, 2020

(65) Prior Publication Data

US 2020/0396391 A1 Dec. 17, 2020

(30) Foreign Application Priority Data

Jun. 11, 2019 (JP) .............................. JP2019-108824

(51) Int. Cl.
*H04N 5/232* (2006.01)
*G06F 3/044* (2006.01)
*G06F 3/0488* (2022.01)
*G06F 3/04845* (2022.01)

(52) U.S. Cl.
CPC ....... *H04N 5/232933* (2018.08); *G06F 3/044* (2013.01); *G06F 3/0488* (2013.01); *G06F 3/04845* (2013.01); *H04N 5/232127* (2018.08); *H04N 5/232939* (2018.08); *G06F 2203/04105* (2013.01)

(58) Field of Classification Search
CPC ....... H04N 5/232933; H04N 5/232939; H04N 5/23216; G06F 3/044; G06F 3/04845; G06F 3/0488; G06F 2203/04105; G06F 3/03547
See application file for complete search history.

(56) References Cited

U.S. PATENT DOCUMENTS

| | | | |
|---|---|---|---|
| 10,402,068 B1* | 9/2019 | Dodge | G06F 3/04845 |
| 11,099,650 B1* | 8/2021 | Haynold | H04N 5/232935 |
| 2006/0026535 A1* | 2/2006 | Hotelling | G06F 3/04883 |
| | | | 715/863 |
| 2008/0252616 A1* | 10/2008 | Chen | G06F 3/0488 |
| | | | 345/173 |

(Continued)

FOREIGN PATENT DOCUMENTS

JP 2007-257650 A 10/2007
JP 2013-025594 A 2/2013

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An electronic device includes: a first detector configured to detect a moving operation of moving an operating object while touching an operation surface with the operating object; a second detector configured to detect a pressing force of the operating object on the operation surface; and a control unit configured to control so that in a case where the moving operation is in a first length and the pressing force is in a first magnitude, an item displayed on a display is moved in a first distance; and in a case where the moving operation is in the first length and the pressing force is in a second magnitude that is different from the first magnitude, the item displayed on the display is moved in a second distance that is longer than the first distance.

12 Claims, 14 Drawing Sheets

(56) References Cited

U.S. PATENT DOCUMENTS

| | | | |
|---|---|---|---|
| 2014/0071049 A1* | 3/2014 | Min | G06F 3/033 345/158 |
| 2014/0362014 A1* | 12/2014 | Ullrich | G06F 3/0488 345/173 |
| 2015/0062052 A1* | 3/2015 | Bernstein | G06F 3/0416 345/173 |
| 2016/0132139 A1* | 5/2016 | Du | G06F 3/0488 345/173 |
| 2016/0188181 A1* | 6/2016 | Smith | G06F 3/048 715/765 |
| 2018/0220062 A1* | 8/2018 | Funatsu | G06F 3/0485 |
| 2019/0141258 A1* | 5/2019 | Yoshida | H04N 5/23216 |
| 2019/0158761 A1* | 5/2019 | Sasai | H04N 5/232 |
| 2019/0324615 A1* | 10/2019 | Chen | G06F 3/0488 |

\* cited by examiner

ELECTRONIC DEVICE CAPABLE OF PERFORMING CONTROL BASED ON A TOUCH OPERATION AND CONTROL METHOD THEREOF

BACKGROUND OF THE INVENTION

Field of the Invention

The present invention relates to an electronic device and a control method thereof, and more particularly, to a technique for performing control in accordance with a pressing force of a touch operation.

Description of the Related Art

In recent years, a technique for moving an item in accordance with an operation of moving a touch position on a touch panel has been known. Japanese Patent Application Laid-Open No. 2007-257650 discloses that a cursor moving speed is changed in accordance with a change in a pressing force applied to a pressing part on a direction key. Japanese Patent Application Laid-Open No. 2013-25594 discloses that a scroll speed after a drag operation is determined in accordance with a pressing force at the end of the drag operation on an operation unit that can be touched and pressed.

As disclosed in Japanese Patent Application Laid-Open No. 2007-257650, when the cursor moving speed is changed in accordance with the change in the pressing force applied to the pressing part on the direction key, another direction cannot be designated during the operation. As disclosed in Japanese Patent Application Laid-Open No. 2013-25594, when the scroll speed after the drag operation is determined in accordance with the pressing force at the end of the drag operation, the item continues to move after the drag operation, and an amount of movement of the item cannot be changed during the drag operation.

SUMMARY OF THE INVENTION

Therefore, the present invention provides an electronic device in which a user can change an amount of movement of an item with good operability.

An electronic device according to the present invention includes: a first detector configured to detect a moving operation of moving an operating object while touching an operation surface with the operating object; a second detector configured to detect a pressing force of the operating object on the operation surface; and at least one memory and at least one processor which function as a control unit configured to control so that in a case where the moving operation detected by the first detector is in a first length and the pressing force detected by the second detector is in a first magnitude, an item displayed on a display is moved in a first distance; and in a case where the moving operation detected by the first detector is in the first length and the pressing force detected by the second detector is in a second magnitude that is different from the first magnitude, the item displayed on the display is moved in a second distance that is longer than the first distance.

Further features of the present invention will become apparent from the following description of exemplary embodiments with reference to the attached drawings.

DESCRIPTION OF THE EMBODIMENTS

Figure 1A:
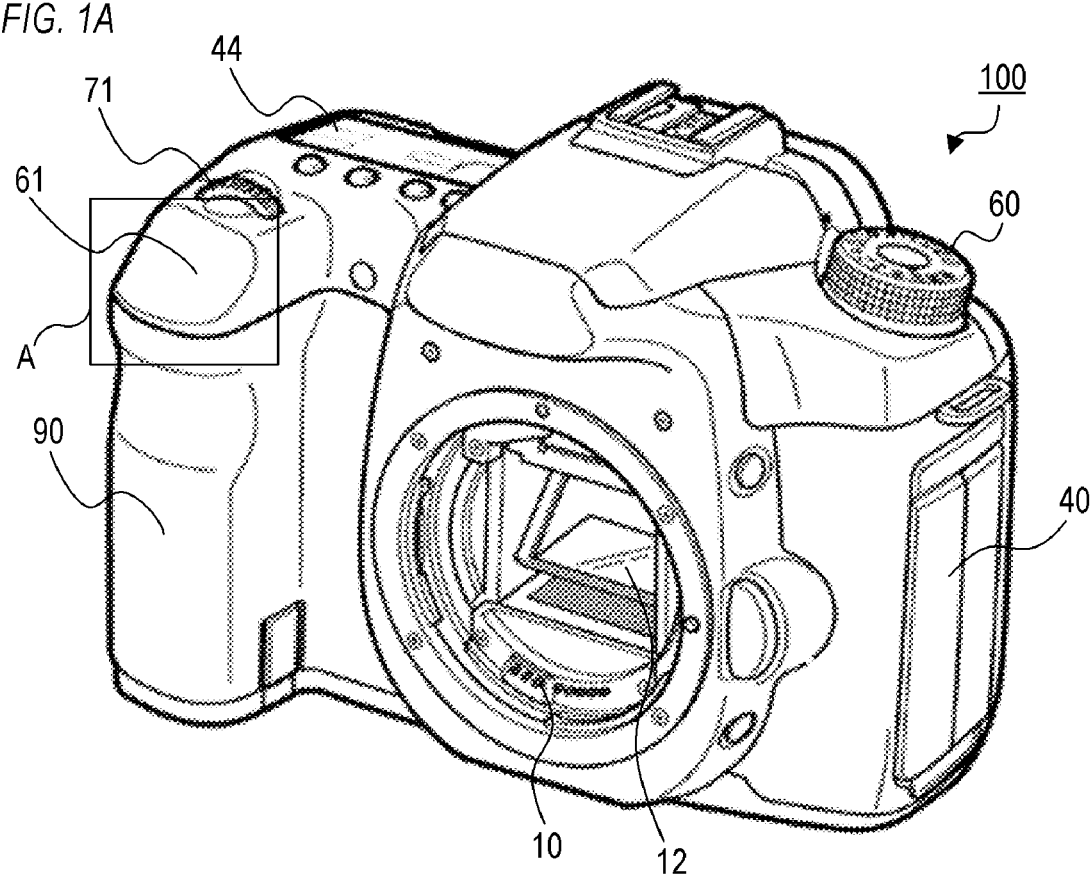
FIGS. 1A and 1B are diagrams showing an exterior of a digital camera.
Figure 1B:
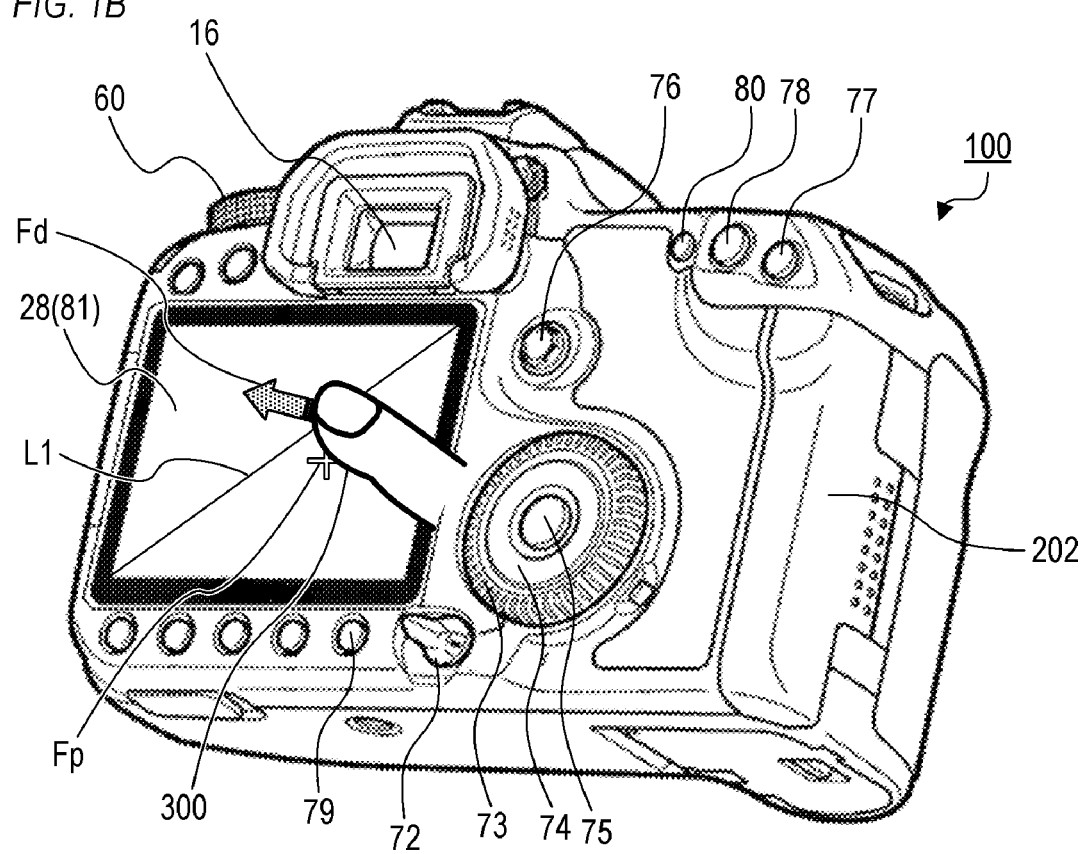

Hereinafter, preferred embodiments of the present invention will be described with reference to the figures. FIGS. 1A and 1B show an exterior of a digital camera 100 (an imaging device) as an example of a device to which the present invention can be applied. FIG. 1A is a front perspective view of the digital camera 100, and FIG. 1B is a rear perspective view of the digital camera 100.

A display 28 is a display provided on a back surface of the digital camera 100 and displays images and various information. A finder exterior display 44 is a display provided on an upper surface of the digital camera 100, and displays various setting values of the digital camera 100 starting from a shutter speed and an aperture. A terminal cover 40 is a cover that protects a connector (not shown) such as a connection cable for connecting the digital camera 100 to an external device. A quick return mirror 12 receives an instruction from a system controller 50 (described later) and is moved up and down by an actuator (not shown). A communication terminal 10 is a communication terminal for allowing the digital camera 100 to communicate with a lens unit 150 (described later; detachable). A finder 16 is a viewfinder type finder for observing a focusing screen 13 (described later) to perform confirmation of a focus and a composition of an optical image for an object obtained through the lens unit 150. A lid 202 is a lid for a slot for storing a recording medium 200 (described later). A grip part 90 is a holding part shaped such that a user can easily hold it with his or her right hand when holding the digital camera 100.

Also, the digital camera 100 has a mode switch 60, a front touch operation member 61, a main electronic dial 71, a power switch 72, a sub electronic dial 73, a four-way key 74, a SET button 75, and an LV button 76. The digital camera 100 also has an enlargement button 77, a reduction button 78, a reproduction button 79, a ranging point selection start button 80, and a touch panel 81. The digital camera 100 may have other operation members. Various operation members will be described later.

Figure 2:
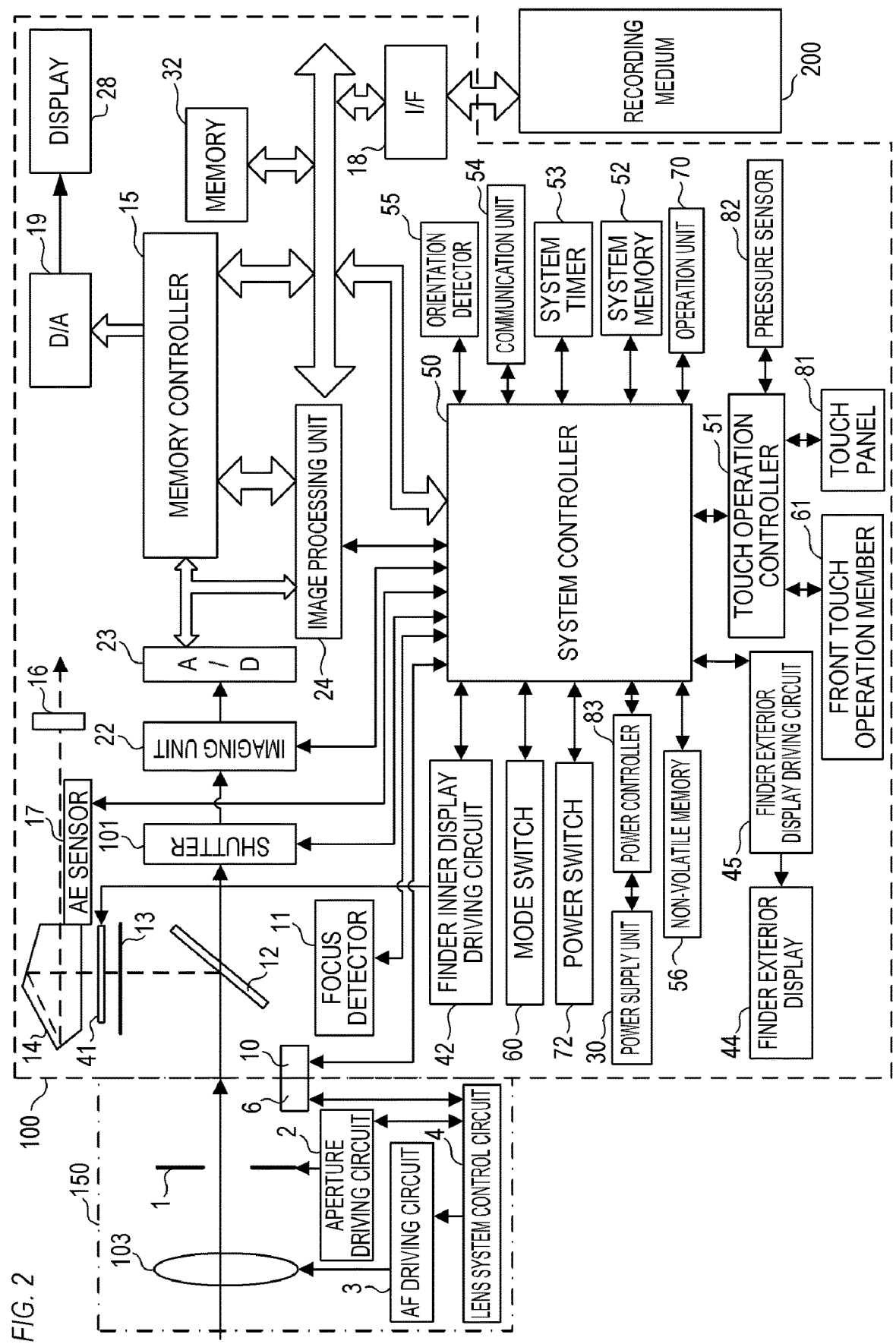
FIG. 2 is a block diagram of the digital camera.

FIG. 2 is a block diagram showing a configuration example of the digital camera 100.

The lens unit 150 is a lens unit on which an interchangeable imaging lens is mounted. A lens 103 is normally configured of a plurality of lenses, but FIG. 2 is simplified and shows only one lens. A communication terminal 6 is a communication terminal for allowing the lens unit 150 to communicate with the digital camera 100 side, and the communication terminal 10 is a communication terminal for allowing the digital camera 100 to communicate with the lens unit 150 side. The lens unit 150 communicates with the system controller 50 via these communication terminals 6 and 10. In addition, the lens unit 150 performs control of an aperture 1 via an aperture driving circuit 2 using an internal lens system control circuit 4. Further, the lens unit 150 adjusts the focus by displacing a position of the lens 103 via an AF driving circuit 3 using the lens system control circuit 4.

The autoexposure (AE) sensor 17 measures brightness of the object (object light) passing through the lens unit 150.

A focus detector 11 outputs information on a defocus amount to the system controller 50. The system controller 50 controls the lens unit 150 on the basis of the information on the defocus amount and performs a phase difference autofocus (AF). The AF may be a contrast AF or an imaging plane phase difference AF instead of the phase difference AF.

The quick return mirror 12 (hereinafter, mirror 12) receives an instruction from the system controller 50 at the time of exposure, live view shooting, video shooting, and the like and is moved up and down by the actuator (not shown). The mirror 12 is a mirror for switching a light flux incident from the lens 103 between the finder 16 side and an imaging unit 22 side. Usually, the mirror 12 is arranged to guide (reflect) the light flux to the finder 16 (mirror down). However, when shooting or live view display is performed, the mirror 12 is caused to jump upward to guide the light flux to the imaging unit 22 and retracts from the light flux (mirror up). Further, the mirror 12 is a half mirror so that a central part thereof can transmit some light and transmits some of the light flux to be incident on the focus detector 11 for performing focus detection.

By observing the focusing screen 13 through a pentaprism 14 and the finder 16, the user can confirm the focus and the composition of the optical image of the object obtained through the lens unit 150.

A shutter 101 is a focal plane shutter that can freely control exposure time of the imaging unit 22 under the control of the system controller 50.

The imaging unit 22 is an imaging element configured of a charge coupled device (CCD) or a complementary metal oxide semiconductor (CMOS) element that converts an optical image into an electrical signal. An A/D converter 23 converts an analog signal output from the imaging unit 22 into a digital signal.

An image processing unit 24 performs predetermined processing (pixel interpolation, resize processing such as reduction, color conversion processing, and the like) on data from the A/D converter 23 or data from a memory controller 15. Also, the image processing unit 24 performs a predetermined calculation process using captured image data, and the system controller 50 performs exposure control and ranging control on the basis of the obtained calculation results. Thus, through-the-lens (TTL) type autofocus (AF) processing, autoexposure (AE) processing, flash pre-emission (EF) processing, and the like are performed. The image processing unit 24 further performs predetermined calculation processing using the captured image data and performs TTL type auto white balance (AWB) processing on the basis of obtained calculation results.

Output data from the A/D converter 23 is directly written in the memory 32 via the image processing unit 24 and the memory controller 15 or via the memory controller 15. The memory 32 stores image data that is obtained by the imaging unit 22 and converted into digital data by the A/D converter 23 and image data to be displayed on the display 28. The memory 32 includes a sufficient storage capacity for storing a predetermined number of still images and a predetermined amount of time of videos and audios.

Further, the memory 32 also serves as an image display memory (a video memory). A D/A converter 19 converts image display data stored in the memory 32 into an analog signal and supplies the analog signal to the display 28. Thus, the display image data written in the memory 32 is displayed on the display 28 via the D/A converter 19. The display 28 performs display in accordance with the analog signal from the D/A converter 19 on a display such as an LCD or the like. The digital signal that is A/D-converted by the A/D converter 23 and stored in the memory 32 is D/A-converted by the D/A converter 19 and sequentially transferred to the display 28 so that a function of an electronic viewfinder can be realized, and a through image display (live view display) can be performed. Hereinafter, an image displayed in the live view display is referred to as a "LV image."

An item (including an AF frame indicating a ranging point at which autofocus is currently performed) for selecting an object to be focused through a finder inner display driving circuit 42, an icon indicating a setting state of the digital camera 100, and the like are displayed in a finder inner display 41.

Various setting values of the digital camera 100 starting from the shutter speed and the aperture are displayed on a finder exterior display 44 via a finder exterior display driving circuit 45.

A non-volatile memory 56 is a memory that can be electrically erased and recorded on, and, for example, an electrically erasable programmable read only memory (EEPROM) or the like is used there as. The non-volatile memory 56 stores constants, programs, and the like for an operation of the system controller 50. The programs referred to here are programs for executing various flowcharts, which will be described later in the present embodiment.

The system controller 50 is a controller including at least one processor or circuit and controls the entire digital camera 100. The system controller 50 realizes each process of the present embodiment, which will be described later, by executing programs recorded in the non-volatile memory 56 described above. A system memory 52 is, for example, a random access memory (RAM), and the system controller 50 develops, in the system memory 52, constants and variables for the operation of the system controller 50, programs read out from the non-volatile memory 56, and the like. Also, the system controller 50 performs display control by controlling the memory 32, the D/A converter 19, the display 28, and the like.

A system timer 53 is a time measuring unit that measures a time used for various controls and a time of an embedded clock.

A power controller 83 is configured of a battery detection circuit, a DC-DC converter, a switch circuit for switching a block to be energized, and the like, and detects whether or not a battery is mounted, a type of the battery, a remaining battery level, and the like. Further, the power controller 83 controls the DC-DC converter on the basis of the detection results and an instruction of the system controller 50 and supplies a necessary voltage to each unit including the recording medium 200 for a necessary period. A power supply unit 30 is configured of a primary battery such as an alkaline battery or a lithium battery, a secondary battery such as a NiCd battery, a NiMH battery, or a Li battery, an AC adapter, or the like.

A recording medium I/F 18 is an interface with the recording medium 200 such as a memory card or a hard disk. The recording medium 200 is a recording medium such as a memory card for recording captured images and is configured of a semiconductor memory, a magnetic disk, or the like.

A communication unit 54 transmits and receives a video signal and an audio signal to and from an external device connected in a wireless manner or by a wired cable. The communication unit 54 can also be connected to a wireless local area network (LAN) or the Internet. The communication unit 54 can transmit an image (including the LV image) captured by the imaging unit 22 and an image recorded in the recording medium 200 and can receive image data and various other information from the external device.

An orientation detector 55 detects an orientation of the digital camera 100 with respect to a direction of gravity. On the basis of the orientation detected by the orientation detector 55, it can be determined whether an image captured by the imaging unit 22 is an image captured by holding the digital camera 100 horizontally or an image captured by holding the digital camera 100 vertically. The system controller 50 can add orientation information corresponding to the orientation detected by the orientation detector 55 to an image file of the image (captured image) captured by the imaging unit 22, or can record the image by rotating it. For the orientation detector 55, an acceleration sensor, a gyro sensor, or the like can be used. It is also possible to detect movement (a pan, a tilt, a lift, whether it is stationary or not, etc.) of the digital camera 100 using the acceleration sensor or the gyro sensor serving as the orientation detector 55.

An operation unit 70 is an operation unit for inputting various operation instructions to the system controller 50. The operation unit 70 includes various operation members as an input unit that receives an operation (user operation) from the user. For example, the operation unit 70 includes a push button, a rotary dial, a touch sensor, and the like. Specifically, as described with reference to FIGS. 1A and 1B, the operation unit 70 includes the mode switch 60, the front touch operation member 61, the main electronic dial 71, the power switch 72, the sub electronic dial 73, the four-way key 74, the SET button 75, and the LV button 76. Also, the operation unit 70 includes the enlargement button 77, the reduction button 78, the reproduction button 79, the ranging point selection start button 80, and the touch panel 81.

The mode switch 60 is an operation member for switching between various modes. The mode switch 60 switches an operation mode of the system controller 50 to any one of a still image recording mode, a video shooting mode, a reproduction mode, and the like. Modes included in the still image recording mode include an auto shooting mode, an auto scene determination mode, a manual mode, an aperture priority mode (Av mode), a shutter speed priority mode (Tv mode), and a program AE mode. In addition, there are various scene modes, custom modes, and the like, which are imaging settings for each imaging scene. The mode switch 60 allows the user to directly switch to any of these modes. Alternatively, after temporarily switching to a list screen of imaging modes with the mode switch 60, the mode may be selectively switched to any of displayed modes by using another operation member. Similarly, the video shooting mode may also include a plurality of modes.

The main electronic dial 71 is a rotary operation member, and by turning the main electronic dial 71, the setting values such as the shutter speed and the aperture can be changed. The power switch 72 is an operation member for switching power of the digital camera 100 on and off. The sub electronic dial 73 is a rotary operation member, and by turning the sub electronic dial 73, movement of a selection frame, transmission of images, and the like can be performed. The four-way key 74 is configured such that each of upper, lower, left, and right parts thereof can be pressed. Processing corresponding to a pressed part of the four-way key 74 can be performed. The SET button 75 is a push button and is mainly used to determine a selected item. The LV button 76 is a button for switching a live view (hereinafter, LV) in a still image capturing mode on and off. In the video shooting mode, the LV button 76 is used to start and stop video shooting (recording).

The enlargement button 77 is an operation button for switching an enlargement mode on and off and changing an enlargement ratio during the enlargement mode in the live view display of an imaging mode. In a reproduction mode, the enlargement button 77 functions as an enlargement button for enlarging a reproduced image or increasing an enlargement ratio thereof. The reduction button 78 is a button for reducing an enlargement ratio of the enlarged reproduced image to reduce a size of a displayed image. The reproduction button 79 is an operation button for switching between the imaging mode and the reproduction mode. By pressing the reproduction button 79 during the imaging mode, the mode is changed to the reproduction mode, and a latest image among images recorded on the recording medium 200 can be displayed on the display 28. The ranging point selection start button 80 is an operation button for switching to a ranging point selection mode.

The front touch operation member 61 is an operation member for starting imaging, selecting an object on which to focus, and the like in accordance with an operation by an operating body (an operating object) such as a finger 300 of the user.

The touch panel 81 and the display 28 can be integrally formed with each other. For example, the touch panel 81 is configured such that light transmittance does not hinder display on the display 28, and is attached to an upper layer of a display surface of the display 28. In addition, input coordinates on the touch panel 81 are associated with display coordinates on the display surface of the display 28. Thus, it is possible to provide a graphical user interface (GUI) that gives the user the impression of directly operating a screen displayed on the display 28. Alternatively, in the case in which an operation on the touch panel 81 is received while nothing is displayed on the display 28, similarly to the front touch operation member 61, the display 28 (the touch panel 81) can be used as an operation member such as a touch pad.

Hereinafter, each of the front touch operation member 61 and the touch panel 81 will be referred to as a touch operation member without distinguishing between the front touch operation member 61 and the touch panel 81. A touch operation controller 51 can detect the following operation or state on the touch operation member.

A finger or pen that was not touching the touch panel newly touches the touch panel. That is, this is the start of a touch (hereinafter referred to as a touch-down).

A state in which the touch panel is being touched with a finger or a pen (hereinafter referred to as a touch-on).

A finger or a pen is moving while touching the touch panel (hereinafter referred to as a touch-move).

A finger or pen that was touching the touch panel is separated (released) from the touch panel. That is, this is the end of the touch (hereinafter, referred to as a touch-up).

A state in which nothing is touching the touch panel (hereinafter referred to as a touch-off).

When the touch-down is detected, the touch-on is also detected at the same time. After the touch-down, the touch-on is usually continuously detected unless the touch-up is detected. When the touch-move is detected, the touch-on is also detected at the same time. Even when the touch-on is detected, the touch-move is not detected unless a touch position is moved. After the touch-up of all touching fingers or pens is detected, it becomes the touch-off.

The touch operation controller 51 is notified via an internal bus of these operations and states and position coordinates (a touch position Fp) at which the finger or the pen is touching the touch operation member. Then, the touch operation controller 51 determines what operation (touch operation) has been performed on the touch operation member on the basis of the information of which it is notified. In the touch-move, a moving direction (touch-move moving direction Fd) and a movement amount (touch-move movement amount Fm) of the finger or the pen moving on the touch operation member can be determined for each of a vertical component and a horizontal component on the touch operation member on the basis of a change in the touch position Fp. When it is detected that the touch-move has been performed for at least a predetermined distance, it is determined that a sliding operation has been performed.

The touch operation member (each of the front touch operation member 61 and the touch panel 81) may be any of various types of operation members such as a resistive film type, a capacitance type, a surface acoustic wave type, an infrared type, an electromagnetic induction type, an image recognition type, an optical sensor type, etc. There are a method of detecting that a touch has occurred from the fact that contact with the touch operation member has occurred and a method of detecting that a touch has occurred from the fact that the finger or pen has approached the touch operation member, and either method may be used.

The pressure sensor 82 (continuously) detects a pressing force of the operating body on an operation surface of the touch operation member. For example, the pressure sensor 82 has a strain gauge sensor provided at a part distorted by pressing the operation surface of the touch operation member and determines (detects) the pressing force from an output value of the strain gauge sensor. Alternatively, the pressure sensor 82 has a capacitance sensor provided parallel to the touch operation member and determines a distance between the operating body and the capacitance sensor from a capacitance value of the capacitance sensor. When the operation surface is distorted by the pressing, the distance between the operating body and the capacitance sensor changes, and the capacitance value of the capacitance sensor also changes. Then, the pressure sensor 82 determines the pressing force from the distance between the operating body and the capacitance sensor and outputs the distance as the pressing force. The pressure sensor 82 may be of another type as long as it can detect the pressing force of the operating body on the operation surface of the touch operation member. Further, the pressure sensor 82 may be configured integrally with the touch operation member.

Also, a pressing state may be determined when a pressing force having at least a predetermined magnitude is detected, or the pressing state may be determined when the pressing force increases by a predetermined amount or more. Specifically, the touch operation controller 51 detects the pressing force on the touch operation member at predetermined time intervals or constantly, and when the pressing force having at least the predetermined magnitude is detected, or when the pressing force increases by the predetermined amount or more, it is determined that a pressed state has occurred. In addition, when a pressing force less than a predetermined magnitude is detected, or when the pressing force decreases, the touch operation controller 51 determines that a non-pressed state has occurred. Also, even in the pressed state, the touch operation member can receive an operation (touch-move) associated with movement of the touch position. In the present embodiment, when the touch-move is detected, the system controller 50 moves an item such as the AF frame in a direction corresponding to the touch-move moving direction Fd by a distance corresponding to the touch-move movement amount Fm.

When the front touch operation member 61 is pressed with a first force (for example, about 70 gf), it enters an on state of a so-called half-press (an instruction for imaging preparation), and the touch operation controller 51 generates a first shutter switch signal SW1. The system controller 50 starts an imaging preparation operation such as an AF process, an AE process, an AWB process, and an EF process in response to the first shutter switch signal SW1.

In addition, when the front touch operation member 61 is pressed with a second force (for example, about 260 gf) larger than the first force, it enters an on state of a so-called full-press (imaging instruction), and the touch operation controller 51 generates a second shutter switch signal SW2. The system controller 50 starts a series of imaging process operations from signal reading from the imaging unit 22 to writing of a captured image as an image file on the recording medium 200 in response to the second shutter switch signal SW2.

Figure 3A:
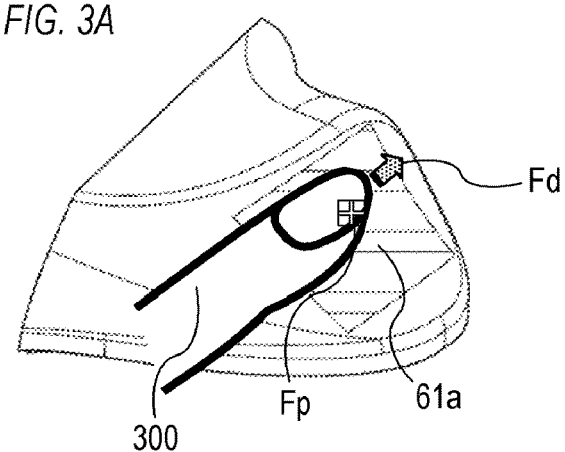
FIGS. 3A to 3E are diagrams showing a configuration of a front touch operation member.
Figure 3B:
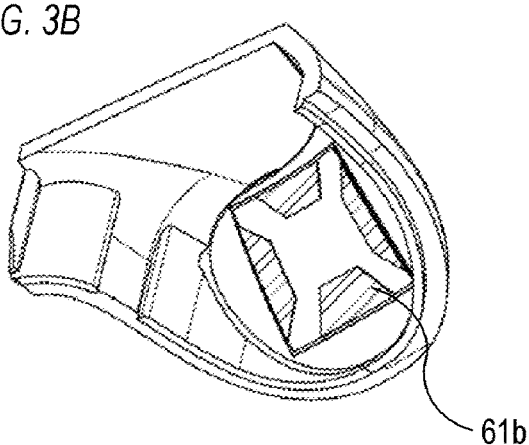
Figure 3C:
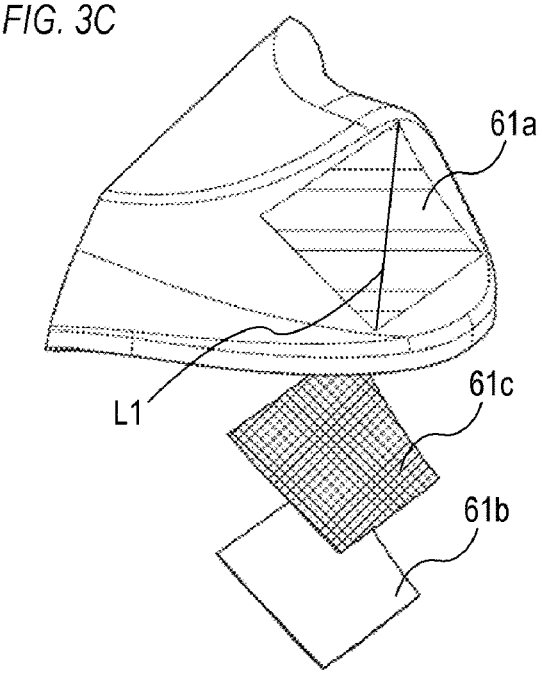
Figure 3D:
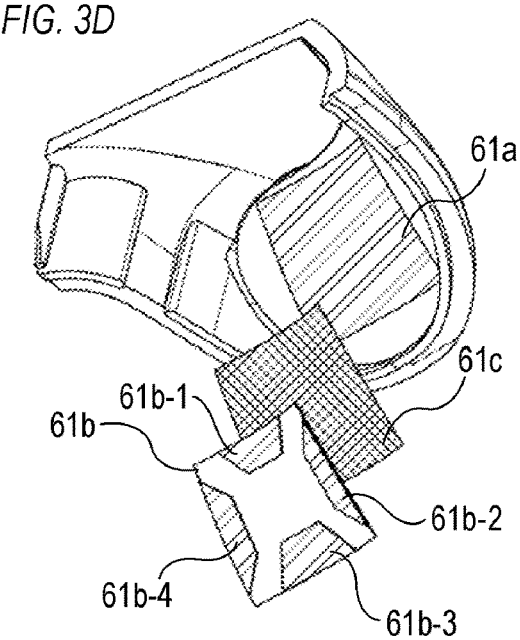

FIGS. 3A to 3D show a configuration example of the front touch operation member 61, and are partial views showing a part A in FIG. 1A. FIG. 3A is a perspective view of the front touch operation member 61 from a front side, and FIG. 3B is a perspective view of the front touch operation member 61 from a back side. FIG. 3C is an exploded perspective view of the front touch operation member 61 from the front side, and FIG. 3D is an exploded perspective view of the front touch operation member 61 from the back side.

The front touch operation member 61 is an operation member configured such that a part of an external housing of the digital camera 100 can be touch-operated, and includes a touch-operable section 61a. A touch operation detector 61b having substantially the same area as the touch-operable section 61a is fixed inside the touch-operable section 61a by a touch detector fixing member 61c such as an adhesive. As described above, since the front touch operation member 61 is configured of an exterior housing, there is no need to provide a hole or the like for providing a button in the exterior housing, and dust-proof and drip-proof properties and a degree of freedom in exterior design can be improved. Further, the front touch operation member 61 is provided at a position at which an index finger of the user is naturally placed when the user grips the digital camera 100, which makes it possible to always maintain a stable gripped state even at the time of changing camera settings. For that reason, it is possible to provide the digital camera 100 with good operability and make a user less likely to miss a crucial moment.

Figure 3E:
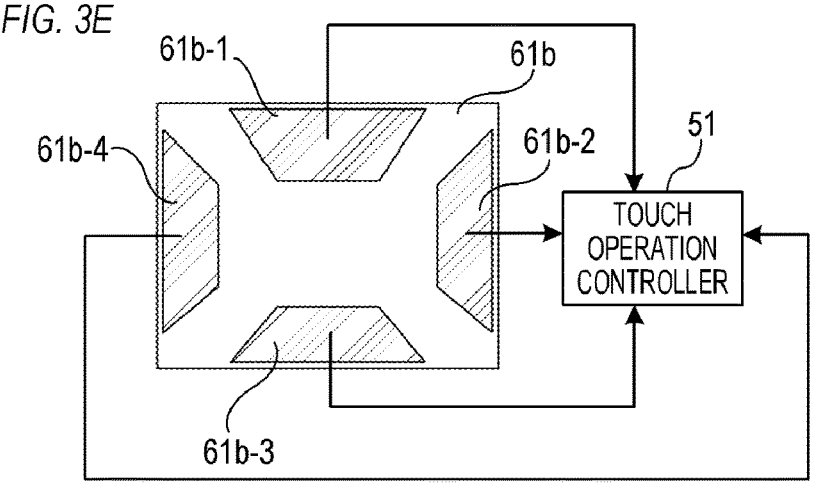

FIG. 3E shows a configuration example of the touch operation detector 61b. The touch operation detector 61b is configured of a so-called flexible printed circuit board (FPC) in which patterns are formed of a copper foil on a polyimide base. Copper patterns 61b-1, 61b-2, 61b-3, and 61b-4 are formed at four locations on upper, lower, left, and right sides within an external shape of the touch operation detector 61b that covers the entire touch-operable section 61a. The copper pattern 61*b*-1 corresponds to an upper detection part, the copper pattern 61*b*-3 corresponds to a lower detection part, the copper pattern 61*b*-2 corresponds to a right detection part, and the copper pattern 61*b*-4 corresponds to a left detection part. Each of the copper patterns 61*b*-1, 61*b*-2, 61*b*-3, and 61*b*-4 is connected to the touch operation controller 51. The touch operation controller 51 detects capacitances and changes in capacitance of the upper, lower, left, and right detection parts, so that the touch position Fp, the touch-move movement amount Fm, and the touch-move moving direction Fd can be detected.

FIRST EXAMPLE

In a first example, an example will be described in which a movement amount of an item (such as the AF frame) with respect to the touch-move movement amount Fm is constantly changed in response to a change in pressing force applied to the touch operation member to enable any point (ranging point) to be selected more quickly and accurately. Here, it is assumed that the item moving in response to the touch-move is the AF frame displayed on the finder inner display 41, and that the operating body performing an operation on the touch operation member is the finger 300.

Figure 4A:
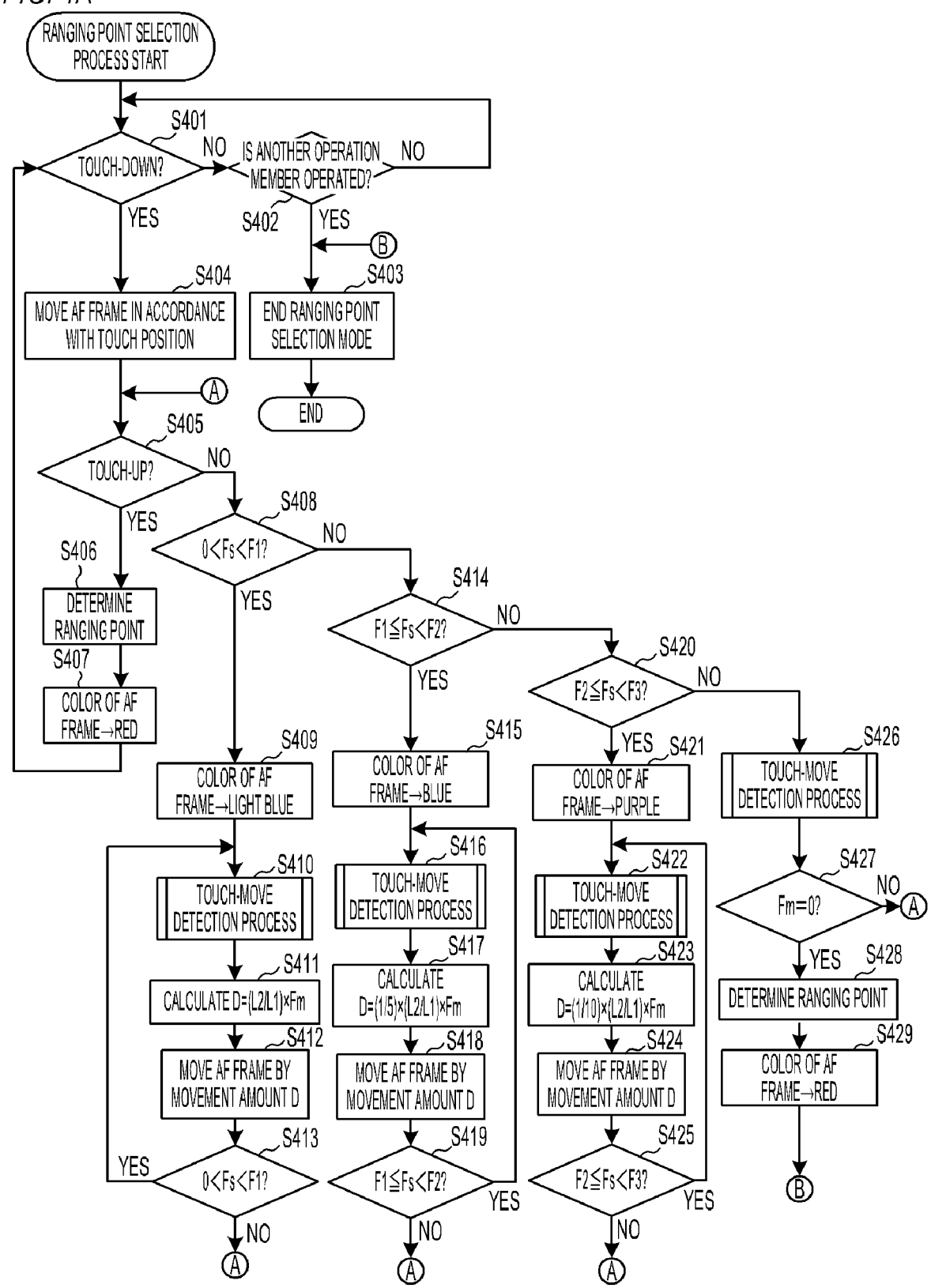
FIGS. 4A and 4B are flowcharts of a ranging point selection process according to a first example.

FIG. 4A is a flowchart showing details of the ranging point selection process performed by the digital camera 100. This process is realized by the system controller 50 developing a program recorded in the non-volatile memory 56 into the system memory 52 and executing the program. When the power of the digital camera 100 is turned on and the ranging point selection start button 80 is pressed to shift to the ranging point selection mode, the process of FIG. 4A starts.

In S401, the system controller 50 uses the touch operation controller 51 to determine whether or not the touch-down has occurred on the touch operation member (the front touch operation member 61 or the touch panel 81). If it is determined that the touch-down has occurred, the process proceeds to S404, and otherwise, the process proceeds to S402.

In S402, the system controller 50 determines whether or not an operation has been performed on another operation member. If it is determined that an operation has been performed on another operation member, the process proceeds to S403, and otherwise, the process returns to S401.

In S403, the system controller 50 ends the ranging point selection mode, and executes a function in response to the operation performed. Then, the ranging point selection process ends.

In S404, the system controller 50 detects the touch position Fp using the touch operation controller 51, and moves the AF frame displayed on the finder inner display 41 to a position corresponding to the touch position Fp by using the finder inner display driving circuit 42. A plurality of positions in an operable area of the touch operation member and a plurality of positions in a photographable area of the finder inner display 41 are associated one-to-one with each other, and the user can select any position in the photographable area by touching the touch operation member. The photographable area is an area in which an object in a photographable range can be confirmed. Also, the AF frame may be displayed to overlap the LV image displayed on the display 28, and in the case in which there is a touch-down on the touch panel 81, the AF frame may be moved to a position on the display 28 at which the finger 300 is placed.

In S405, the system controller 50 uses the touch operation controller 51 to determine whether or not there has been a touch-up on the touch operation member. If it is determined that there has been a touch-up, the process proceeds to S406, and otherwise, the process proceeds to S408.

In S406, the system controller 50 determines a ranging point (AF position) at a current position of the AF frame.

In S407, the system controller 50 changes a color of the AF frame to red using the finder inner display driving circuit 42 so that the fact that the position of the ranging point (AF frame) has been determined can be identified. Then, the process returns to S401. Also, in an initial state, the color of the AF frame is white or the like.

In S408, the system controller 50 uses the pressure sensor 82 and the touch operation controller 51 to determine whether or not a pressing force Fs on the touch operation member is larger than 0 and smaller than a threshold F1. If it is determined that the relation of 0<Fs<F1 is satisfied, the process proceeds to S409, and otherwise, the process proceeds to S414.

In S409, the system controller 50 changes the color of the AF frame to light blue using the finder inner display driving circuit 42 so that the relation of 0<Fs<F1 and the like can be identified.

Figure 4B:
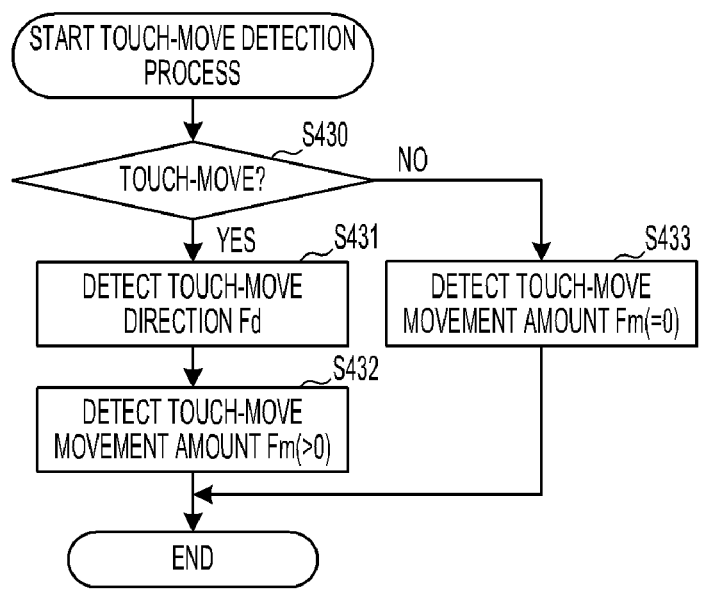

In S410, the system controller 50 performs a touch-move detection process. FIG. 4B is a flowchart showing details of the touch-move detection process. This process is realized by the system controller 50 developing a program recorded in the non-volatile memory 56 into the system memory 52 and executing the program.

The touch-move detection process will be described. In S430, the system controller 50 uses the touch operation controller 51 to determine whether or not a touch-move has been performed on the touch operation member. If it is determined that there has been the touch-move, the process proceeds to S431, and otherwise, the process proceeds to S433. In S431, the system controller 50 uses the touch operation controller 51 to detect the touch-move moving direction Fd from a change of the touch position Fp with the lapse of time. In S432, the system controller 50 uses the touch operation controller 51 to detect the touch-move movement amount Fm greater than 0 from the change of the touch position Fp with the lapse of time. Thereafter, the touch-move detection process ends. In S433, since there is no change of the touch position Fp with the lapse of time, the system controller 50 detects 0 as the touch-move movement amount Fm. Thereafter, the touch-move detection process ends.

Returning to the description of the ranging point selection process (FIG. 4A), in S411, the system controller 50 calculates a movement amount D of the AF frame with respect to the touch-move movement amount Fm detected in S410, using the function "D=(L2/L1)×Fm." Also, "L1" is a diagonal length of the operable area (operation surface) of the touch operation member, and "L2" is a diagonal length of the photographable area of the finder inner display 41. When the function "D=(L2/L1)×Fm" is used, it is possible to move the AF frame over the entire photographable area by one touch-move on the touch operation member.

In S412, the system controller 50 uses the finder inner display driving circuit 42 to move the AF frame by the movement amount D=(L2/L1)×Fm calculated in S411 in a direction corresponding to the touch-move moving direction Fd detected in S410.

Figure 5A:
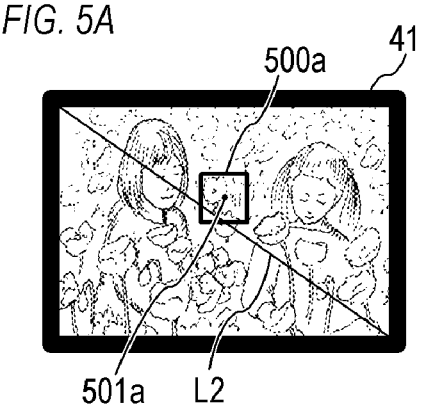
FIGS. 5A to 5I are diagrams showing operations according to the first example.
Figure 5B:
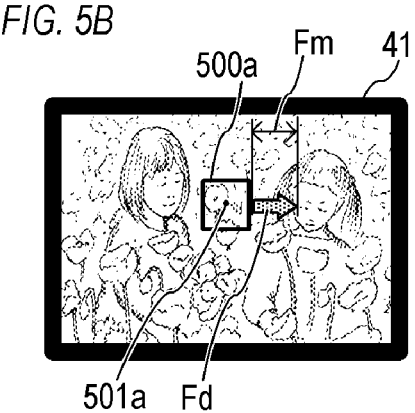
Figure 5C:
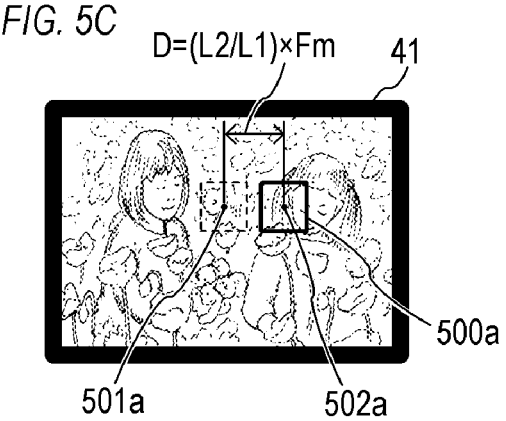

The operation of S412 will be described with reference to FIGS. 5A to 5C. FIGS. 5A to 5C show an example of an operation when the touch-down or touch-move of 0<Fs<F1 is performed. For ease of explanation, FIG. 5B depicts the touch-move on the touch operation member as if it were a touch-move on the finder inner display 41. FIG. 5A shows a state of the finder inner display 41 before the touch-move is performed (at the time of a touch-down), and the AF frame 500a of light-blue is displayed at a position 501a corresponding to the touch position Fp. FIG. 5B shows a state in which the touch-move is being performed, in which the touch-move for moving the operating body rightward is being performed. FIG. 5C shows a state at the end of the touch-move in FIG. 5B, in which the AF frame 500a is moved to a position 502a to which the position 501a has moved rightward by the movement amount D=(L2/L1)×Fm.

Returning to the description of the ranging point selection process (FIG. 4A), in S413, the system controller 50 uses the pressure sensor 82 and the touch operation controller 51 to determine whether or not the pressing force Fs on the touch operation member is larger than 0 and smaller than the threshold F1. If it is determined that the relation of 0<Fs<F1 is satisfied, the process returns to S410, and otherwise, the process returns to S405.

In S414, the system controller 50 uses the pressure sensor 82 and the touch operation controller 51 to determine whether or not the pressing force Fs on the touch operation member is at least the threshold F1 and less than a threshold F2. If it is determined that the relation F1≤Fs≤F2 is satisfied, the process proceeds to S415, and otherwise, the process proceeds to S420.

In S415, the system controller 50 changes the color of the AF frame to blue using the finder inner display driving circuit 42 so that the relation of F1=Fs≤F2 or the like can be identified.

In S416, the system controller 50 performs the touch-move detection process of FIG. 4B.

In S417, the system controller 50 calculates the movement amount D of the AF frame with respect to the touch-move movement amount Fm detected in S416 using the function "D=(1/5)×(L2/L1)×Fm." By using the function "D=(1/5)×(L2/L1)×Fm," it is possible to calculate the movement amount D relatively smaller than S411, thereby adjusting the position of the ranging point (AF frame) more finely.

In S418, the system controller 50 uses the finder inner display driving circuit 42 to move the AF frame by the movement amount D=(1/5)×(L2/L1)×Fm calculated in S417 in the direction corresponding to the touch-move moving direction Fd detected in S416.

Figure 5D:
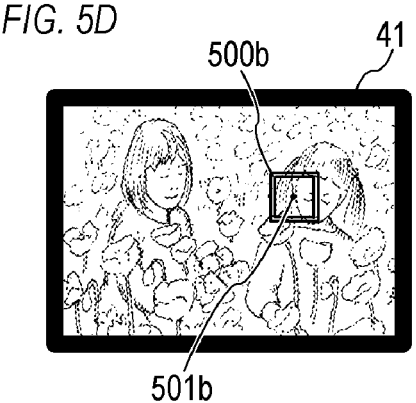
Figure 5E:
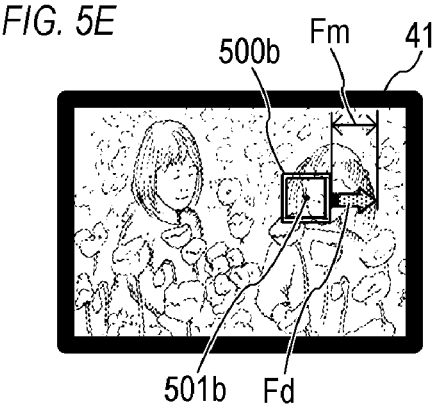
Figure 5F:
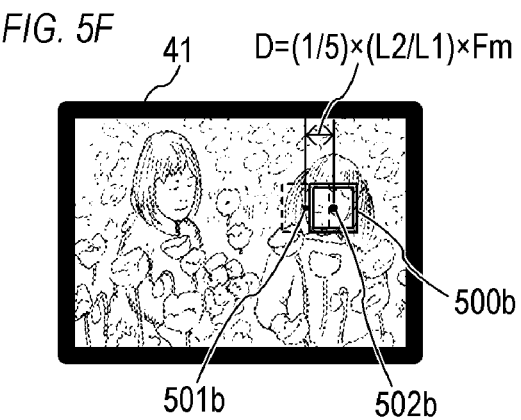

The operation of S418 will be described with reference to FIGS. 5D to 5F. FIGS. 5D to 5F show an example of an operation when the touch-down or touch-move of F1≤Fs<F2 is performed. FIG. 5D shows a state of the finder inner display 41 before the touch-move is performed (at the time of the touch-down), and the AF frame 500b of blue is displayed at a position 501b corresponding to the touch position Fp. FIG. 5E shows a state in which the touch-move is being performed, in which the touch-move for moving the operating body rightward is being performed. FIG. 5F shows a state at the end of the touch-move of FIG. 5E, in which the AF frame 500b is moved to a position 502b to which the position 501b has moved rightward by the movement amount D=(1/5)×(L2/L1)×Fm. The touch-move movement amount Fm in FIG. 5E is the same as the touch-move movement amount Fm in FIG. 5B, but the movement amount D in FIG. 5F is smaller than the movement amount D in FIG. 5C.

Returning to the description of the ranging point selection process (FIG. 4A), in S419, the system controller 50 uses the pressure sensor 82 and the touch operation controller 51 to determine whether or not the pressing force Fs on the touch operation member is at least the threshold F1 and less than the threshold F2. If it is determined that the relation of F1≤Fs<F2 is satisfied, the process returns to S416, and otherwise, the process returns to S405.

In S420, the system controller 50 uses the pressure sensor 82 and the touch operation controller 51 to determine whether or not the pressing force Fs on the touch operation member is at least the threshold F2 and less than a threshold F3. If it is determined that the relation of F2≤Fs<F3 is satisfied, the process proceeds to S421, and otherwise, the process proceeds to S426. Also, the threshold F3 may be a maximum pressing force that can be detected, a maximum pressing force that can be pressed by the user, or another value. If the pressing force Fs is at least the threshold F2, S420 may be omitted such that the process proceeds to S421 regardless of whether the pressing force Fs is smaller than the threshold F3.

In S421, the system controller 50 changes the color of the AF frame to purple using the finder inner display driving circuit 42 so that the relation of F2≤Fs<F3 or the like can be identified.

In S422, the system controller 50 performs the touch-move detection process of FIG. 4B.

In S423, the system controller 50 calculates the movement amount D of the AF frame with respect to the touch-move movement amount Fm detected in S422 using the function "D=(1/10)×(L2/L1)×Fm." By using the function "D=(1/10)×(L2/L1)×Fm", it is possible to calculate the movement amount D that is relatively smaller than S411 and S417, thereby adjusting the position of the ranging point (AF frame) more finely.

In S424, the system controller 50 uses the finder inner display driving circuit 42 to move the AF frame by the movement amount D=(1/10)×(L2/L1)×Fm calculated in S423 in the direction corresponding to the touch-move moving direction Fd detected in S422.

Figure 5G:
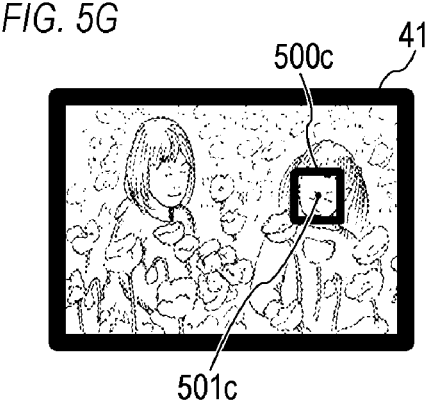
Figure 5H:
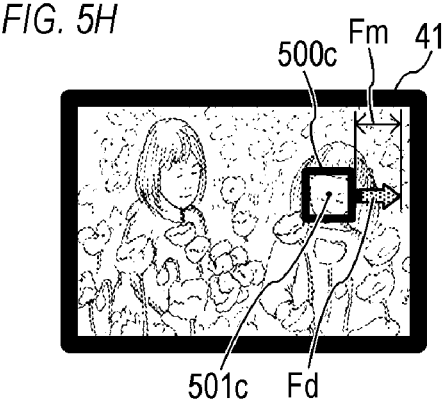
Figure 5I:
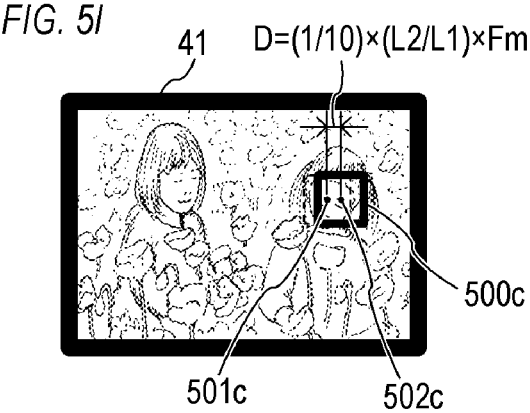

The operation of S424 will be described with reference to FIGS. 5G to 5I. FIGS. 5G to 5I show an example of an operation when the touch-down or touch-move of F2≤Fs<F3 is performed. FIG. 5G shows a state of the finder inner display 41 before the touch-move is performed (at the time of the touch-down), and the AF frame 500c of purple is displayed at a position 501c corresponding to the touch position Fp. FIG. 5H shows a state in which the touch-move is being performed, in which the touch-move for moving the operating body rightward is being performed. FIG. 5I shows a state at the end of the touch-move in FIG. 5H, in which the AF frame 500c is moved to a position 502c to which the position 501c has moved rightward by the movement amount D=(1/10)×(L2/L1)×Fm. The touch-move movement amount Fm in FIG. 5H is the same as the touch-move movement amount Fm in FIGS. 5B and 5E, but the movement amount D in FIG. 5I is smaller than the movement amount D in FIGS. 5C and 5F.

Returning to the description of the ranging point selection process (FIG. 4A), in S425, the system controller 50 uses the pressure sensor 82 and the touch operation controller 51 to determine whether or not the pressing force Fs on the touch operation member is at least the threshold F2 and less than the threshold F3. If it is determined that the relation of F2≤Fs<F3 is satisfied, the process returns to S422, and otherwise, the process returns to S405.

In S426, the system controller 50 performs the touch-move detection process of FIG. 4B.

In S427, the system controller 50 determines whether the touch-move movement amount Fm detected in S426 is 0 or not. If it is determined that the touch-move amount is Fm=0, the process proceeds to S428, and otherwise, the process returns to S405. Also, the threshold in S427 is not limited to 0, and may be a value such as 5 mm or 3 mm. Since a contact area of the finger changes when the user presses, it is likely determined that the touch position at that time has moved. Accordingly, the threshold may be set to a value larger than 0.

In S428, the system controller 50 determines the ranging point at the current position of the AF frame. That is, when the pressing force Fs applied by the user is at least F3, the ranging point is determined. However, if it is determined that the touch-move has been performed as a result of determining whether or not the touch-move has been performed in S427, it is likely that the user has unintentionally increased the pressing force while moving the touch position, and thus the ranging point is not determined. On the other hand, if the pressing force is at least F3 and the touch position is not moved, it is determined that the user has intentionally performed the pressing operation strongly, and thus the ranging point is determined. Also, in S427, instead of determining whether or not the touch position has been moved, it may be determined whether or not a pressing of at least F3 has been performed for at least a predetermined time such as 0.5 second or 1 second. Alternatively, the ranging point may be determined when both the pressing of at least F3 has been performed for at least a predetermined time and the touch-move has not been performed.

In S429, the system controller 50 uses the finder inner display driving circuit 42 to change the color of the AF frame to red so that the fact that the position of the ranging point (AF frame) has been determined can be identified. Thereafter, the process proceeds to S403. In this case, in S403, the ranging point selection mode ends, and the imaging preparation operation and a series of imaging process operations start.

Figure 6:
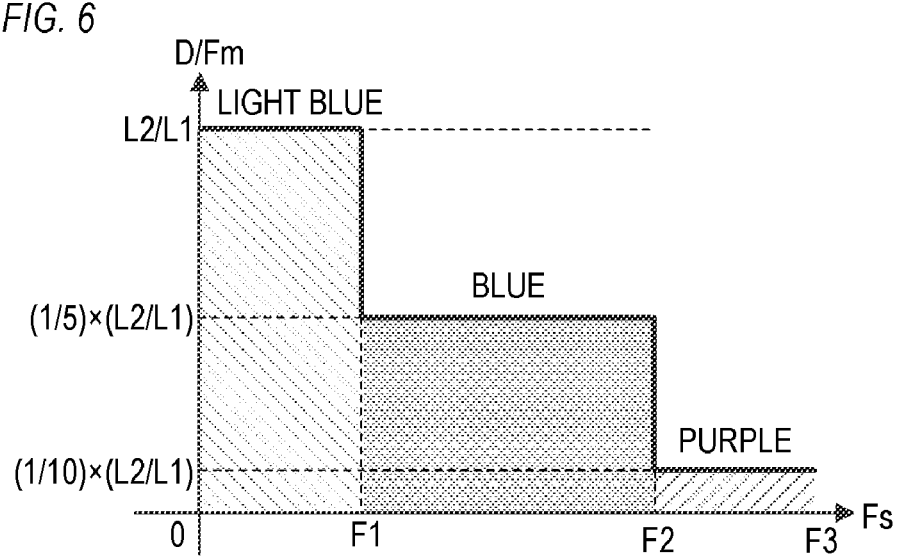
FIG. 6 is a diagram showing a correspondence correlation between a movement ratio and a pressing force according to the first example.

FIG. 6 is a diagram illustrating a correspondence correlation between a movement ratio (a ratio of the movement amount D of the AF frame to the touch-move movement amount Fm) and the pressing force Fs. As shown in FIG. 6, according to the ranging point selection process of FIG. 4A, the movement ratio changes in three stages according to a continuous change of the pressing force Fs. Also, the number of stages may be more or less than three.

Specifically, when the pressing force Fs satisfies 0<Fs<F1, which is relatively low, the movement ratio is equal to a ratio of the diagonal length L2 of the photographable area to the diagonal length L1 of the operable area. For this reason, it is difficult to finely adjust the position of the ranging point (AF frame), but it is possible to cause the ranging point (AF frame) to quickly come closer to a desired position.

When the pressing force Fs satisfies F1≤Fs<F2, which is moderate, the movement ratio is 1/5 of the ratio of the length L2 to the length L1. For this reason, the AF frame cannot be moved over the entire photographable area by one touch-move on the touch operation member, but the position of the ranging point (AF frame) can be finely adjusted.

When the pressing force Fs satisfies F2≤Fs<F3, which is relatively strong, the movement ratio is 1/10 of the ratio of the length L2 to the length L1. For this reason, the position of the ranging point (AF frame) can be more finely adjusted.

As described above, according to the first example, the movement ratio (the ratio of the movement amount D of the AF frame to the touch-move movement amount Fm) changes in accordance with the change in the pressing force Fs. As a result, the user can change the movement amount D of the AF frame with good operability and easily select a desired position as the position of the ranging point.

Further, the color of the AF frame changes in accordance with the change of the pressing force Fs such that the movement ratio and the pressing force Fs are indicated by the color of the AF frame. Thus, the user can easily understand the current movement ratio and the pressing force Fs. Accordingly, the pressing force Fs can be appropriately changed in accordance with the accuracy required for the position adjustment, and erroneous operation can be inhibited to improve operability.

If the touch-move movement amount Fm is not 0, a predetermined function (determination of the ranging point) corresponding to a pressing with the pressing force Fs of at least the threshold F3 is not executed. Thus, when the pressing force Fs is unintentionally increased during the touch-move, an unintended operation of executing the predetermined function can be inhibited, and operability (convenience) can be improved.

An area including the AF frame (an area including the AF frame and its surroundings) may be enlarged and displayed at an enlargement ratio in accordance with the pressing force. However, since an angle of view of the entire photographable area cannot be confirmed, it is preferable not to perform the enlarged display. Also, the item moved by the touch-move is not limited to the AF frame, and may be, for example, a cursor for selecting a menu item. Also, although an example has been described in which the movement amount D of the AF frame with respect to the touch-move movement amount Fm is reduced in accordance with the increase in the pressing force Fs, the movement amount D of the AF frame with respect to the touch-move movement amount Fm may be increased in accordance with the increase in the pressing force Fs. Also, although an example has been described in which the movement amount D of the AF frame with respect to the touch-move movement amount Fm is changed stepwise in accordance with the continuous change in the pressing force Fs, the movement amount D of the AF frame with respect to the touch-move movement amount Fm may be continuously changed. Also, the predetermined function according to the pressing with the pressing force Fs of at least the threshold F3 is not limited to the determination of the ranging point, and may be, for example, a function to return the position of the ranging point to a previous position, a function to display candidates for the ranging point, or the like

SECOND EXAMPLE

In a second example, an example will be described in which the movement amount D of the AF frame with respect to the touch-move movement amount Fm is changed in accordance with the change in the pressing force applied to the touch operation member, and during the touch-move, the movement amount D of the AF frame with respect to the touch-move movement amount Fm is kept constant. Also, descriptions of parts common to those in the first example will be omitted, and the description will focus on parts unique to the second example.

Figure 7:
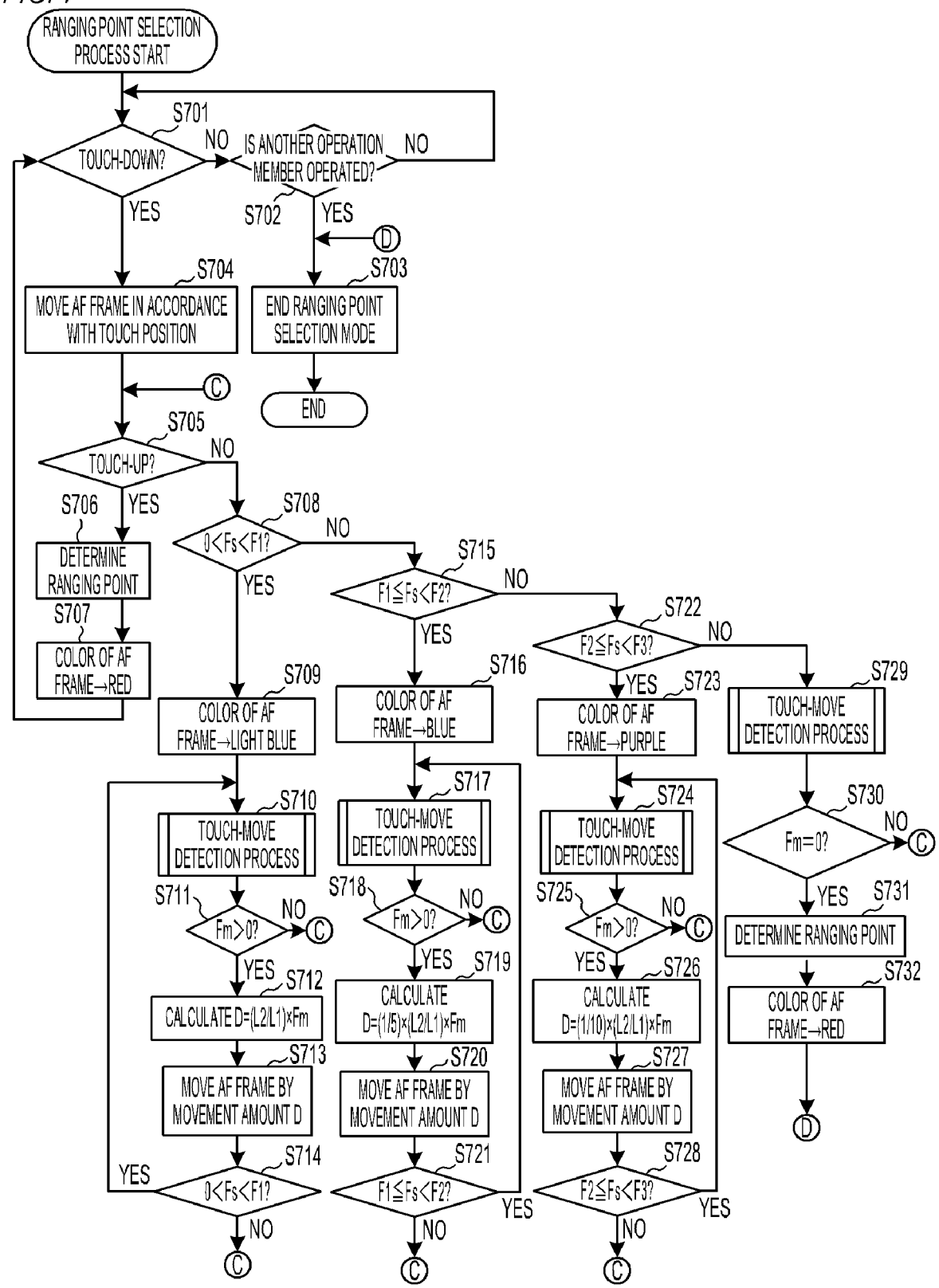
FIG. 7 is a flowchart of a ranging point selection process according to a second example.

FIG. 7 is a flowchart showing details of the ranging point selection process according to the second example. This process is realized by the system controller 50 developing a program recorded in the non-volatile memory 56 into the system memory 52 and executing the program. When the power of the digital camera 100 is turned on and the ranging point selection start button 80 is pressed to shift to the ranging point selection mode, the process of FIG. 7 starts.

S701 to S710 are the same as S401 to S410 in FIG. 4A. In S711, the system controller 50 determines whether or not the touch-move movement amount Fm detected in S710 is larger than 0. When it is determined that the touch-move movement amount Fm satisfies Fm>0, the process proceeds to S712, and otherwise, the process returns to S705. S712 to S714 are the same as S411 to S413 in FIG. 4A. Therefore, at the start of the touch-move of 0<Fs<F1, using the function "D=(L2/L1)×Fm," the movement amount D=(L2/L1)×Fm of the AF frame with respect to the touch-move movement amount Fm detected in S710 is calculated. Then, until the touch-move is completed, even if the pressing force Fs changes (even if the relation of 0<Fs<F1 is not satisfied), the same function continues to be used, and the movement amount D=(L2/L1)×Fm of the AF frame continues to be calculated.

S715 to S717 are the same as S414 to S416 in FIG. 4A. In S718, the system controller 50 determines whether or not the touch-move movement amount Fm detected in S717 is larger than 0. When it is determined that the Fm satisfies Fm>0, the process proceeds to S719, and otherwise, the process returns to S705. S719 to S721 are the same as S417 to S419 in FIG. 4A. Therefore, at the start of the touch-move of F1≤Fs<F2, using the function "D=(1/5)×(L2/L1)×Fm," the movement amount D=(1/5)×(L2/L1)×Fm of the AF frame with respect to the touch-move movement amount Fm detected in S717 is calculated. Then, until the touch-move is completed, even if the pressing force Fs changes (even if the relation of F1≤Fs<F2 is not satisfied), the same function continues to be used, and the movement amount D=(1/5)×(L2/L1)×Fm of the AF frame is continuously calculated.

S722 to S724 are the same as S420 to S422 in FIG. 4A. In S725, the system controller 50 determines whether or not the touch-move movement amount Fm detected in S724 is larger than 0. If it is determined that the touch-move movement amount Fm satisfies Fm>0, the process proceeds to S726, and otherwise, the process returns to S705. S726 to S732 are the same as S423 to S429 in FIG. 4A. Therefore, at the start of the touch-move of F2≤Fs<F3, using the function "D=(1/10)×(L2/L1)×Fm," the movement amount D=(1/10)×(L2/L1)×Fm of the AF frame with respect to the touch-move movement amount Fm detected in S724 is calculated. Then, until the touch-move is completed, even if the pressing force Fs changes (even if the relation of F2≤Fs<F3 is not satisfied), the same function continues to be used, and the movement amount D=(1/10)×(L2/L1)×Fm of the AF frame is continuously calculated.

As described above, according to the second example, at the start of the touch-move, the movement amount D of the AF frame with respect to the touch-move movement amount Fm (the function for calculating the movement amount D) is determined. Then, even if the pressing force Fs changes until the touch-move is completed, the movement amount D of the AF frame with respect to the touch-move movement amount Fm (the function for calculating the movement amount D) does not change. Thus, in the case in which the pressing force Fs changes unintentionally during the touch-move, it is possible to inhibit an unintended operation that the movement ratio (the ratio of the movement amount D of the AF frame to the touch-move movement amount Fm) changes, thereby improving operability (convenience).

THIRD EXAMPLE

In a third example, an example will be described in which a size of the AF frame is further changed in accordance with a change in the pressing force applied to the touch operation member. Also, descriptions of parts common to those in the first and second examples will be omitted, and the description will focus on parts unique to the third example.

Figure 8:
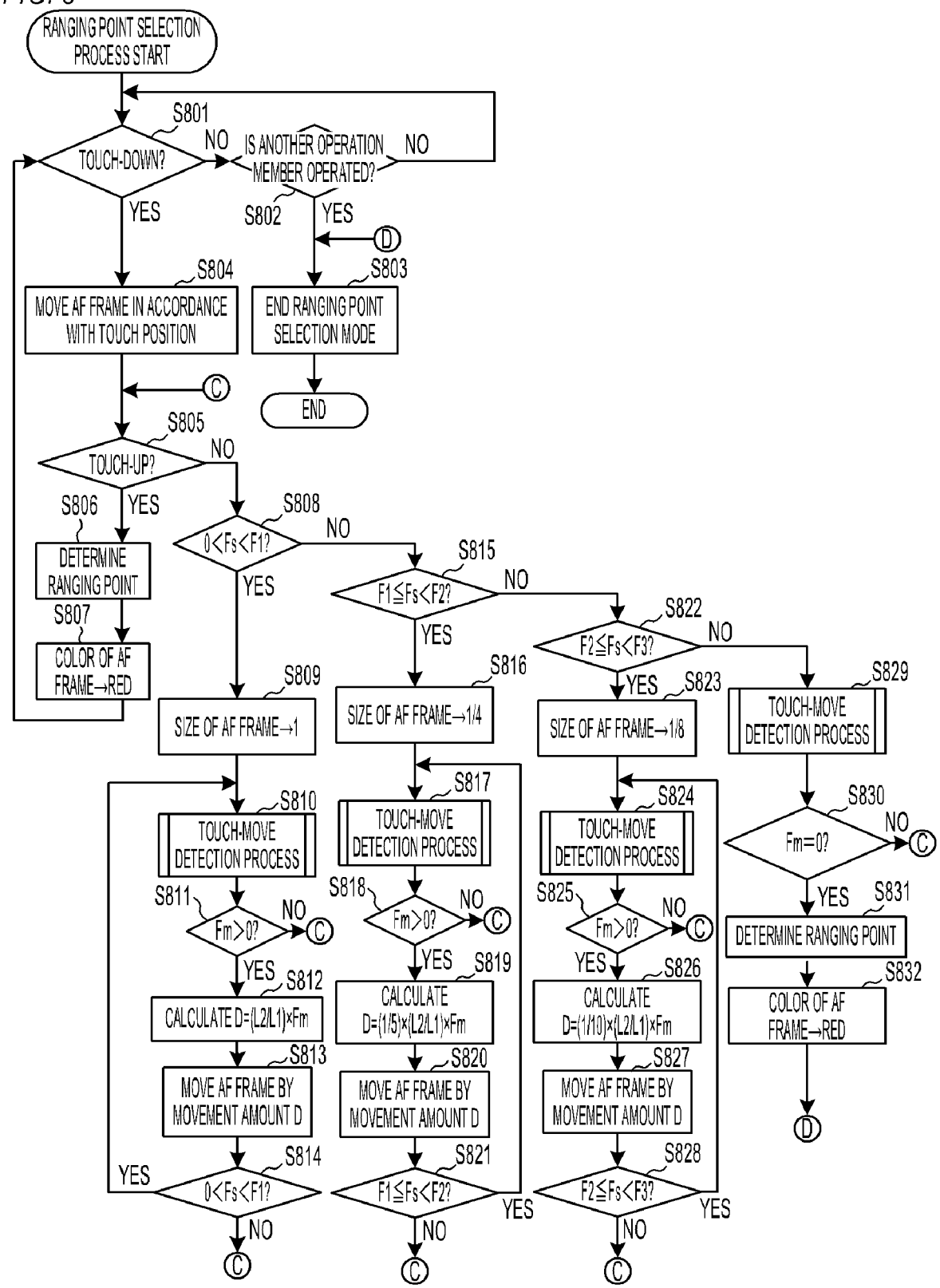
FIG. 8 is a flowchart of a ranging point selection process according to a third example.

FIG. 8 is a flowchart showing details of the ranging point selection process according to the third example. This process is realized by the system controller 50 developing a program recorded in the non-volatile memory 56 into the system memory 52 and executing the program. When the power of the digital camera 100 is turned on and the ranging point selection start button 80 is pressed to shift to the ranging point selection mode, the process of FIG. 8 starts. At the start of the process of FIG. 8, the AF frame is displayed at a size of an initial magnification (1×).

S801 to S808 are the same as S701 to S708 in FIG. 7. In S809, the system controller 50 changes the size of the AF frame to a size having a display magnification=1 using the finder inner display driving circuit 42. S810 to S814 are the same as S710 to S714 in FIG. 7.

Figure 9A:
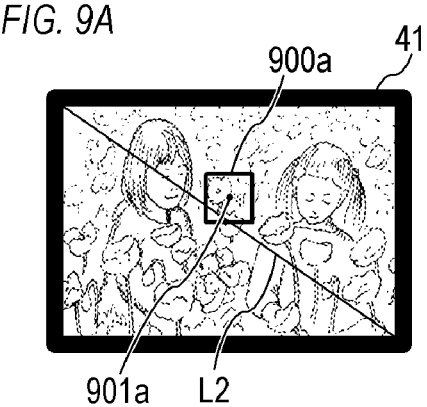
FIGS. 9A to 9I are diagrams showing operations according to the third example.
Figure 9B:
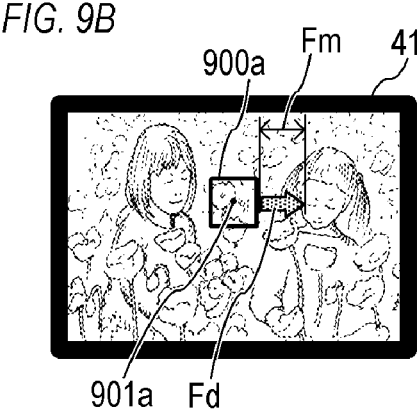
Figure 9C:
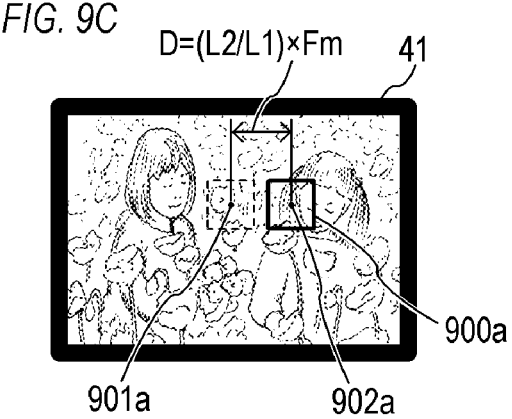

Therefore, when the touch-down or touch-move of 0<Fs<F1 is performed, the operation becomes as shown in FIGS. 9A to 9C. FIG. 9A shows a state of the finder inner display 41 before the touch-move is performed (at the time of the touch-down), and the AF frame 900a of 1× size is displayed at a position 901a corresponding to the touch position Fp. FIG. 9B shows a state in which the touch-move is being performed, in which the touch-move for moving the operating body rightward is being performed. FIG. 9C shows a state at the end of the touch-move in FIG. 9B, in which the AF frame 900a is moved to a position 902a to which the position 901a has moved rightward by the movement amount D=(L2/L1)×Fm.

S815 is the same as S715 in FIG. 7. In S816, the system controller 50 changes the size of the AF frame to a size having the display magnification=¼ using the finder inner display driving circuit 42. S817 to S821 are the same as S717 to S721 in FIG. 7.

Figure 9D:
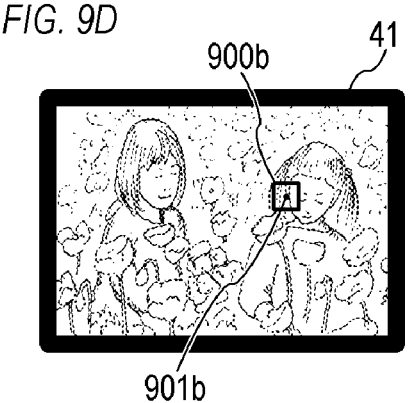
Figure 9E:
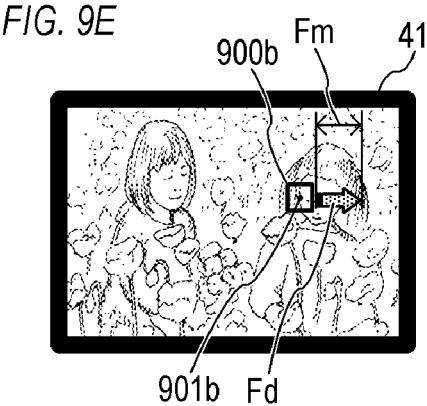
Figure 9F:
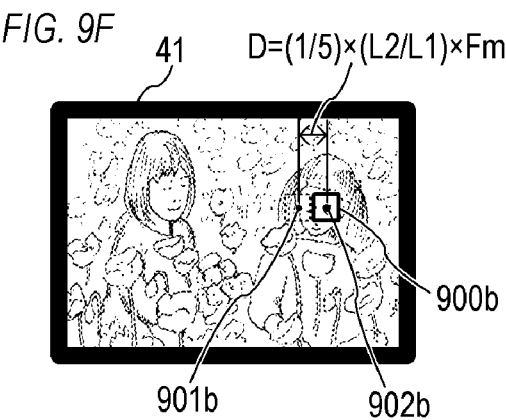

Therefore, when the touch-down or touch-move of F1≤Fs<F2 is performed, the operation becomes as shown in FIGS. 9D to 9F. FIG. 9D shows a state of the finder inner display 41 before the touch-move is performed (at the time of the touch-down), in which the AF frame 900b of ¼ size is displayed at a position 901b corresponding to the touch position Fp. FIG. 9E shows a state that the touch-move is being performed, in which the touch-move for moving the operating body rightward is being performed. FIG. 9F shows a state after the touch-move of FIG. 9E is performed, in which the AF frame 900b is moved to a position 902b to which the position 901b has moved rightward by the movement amount D=(1/5)×(L2/L1)×Fm.

S822 is the same as S722 in FIG. 7. In S823, the system controller 50 changes the size of the AF frame to a size having a display magnification=⅛ using the finder inner display driving circuit 42. S824 to S832 are the same as S724 to S732 in FIG. 7.

Figure 9G:
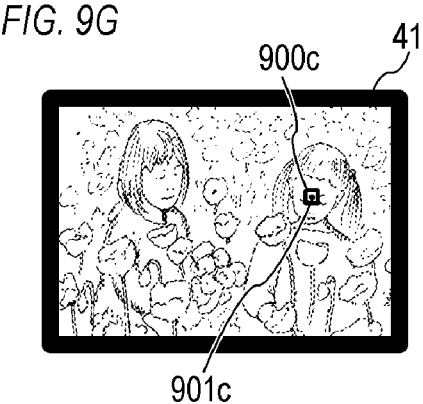
Figure 9H:
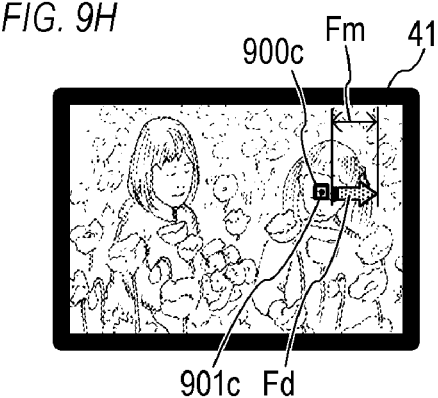
Figure 9I:
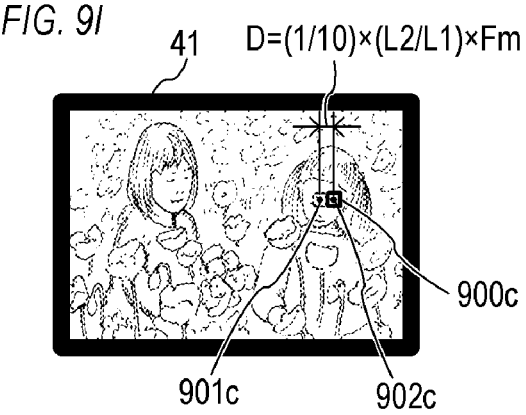

Therefore, when the touch-down or touch-move of F2≤Fs<F3 is performed, the operation becomes as in FIGS. 9G to 9I. FIG. 9G shows a state of the finder inner display 41 before the touch-move is performed (during the touch-down), in which the AF frame 900c of purple is displayed at a position 901c corresponding to the touch position Fp. FIG. 9H shows a state that the touch-move is being performed, in which the touch-move for moving the operating body rightward is being performed. FIG. 9I shows a state at the end of the touch-move of FIG. 9H, in which the AF frame 900c is moved to a position 902c to which the position 901c has moved rightward by the movement amount D=(1/10)×(L2/L1)×Fm.

As described above, according to the third example, the size of the AF frame changes in accordance with a change in the pressing force Fs such that the movement ratio (the ratio of the movement amount D of the AF frame to the touch-move movement amount Fm) is indicated by the size of the AF frame. Thus, since the user can easily understand the current movement ratio, the pressing force Fs can be appropriately changed in accordance with the accuracy required for the position adjustment, and thus erroneous operation can be inhibited to improve operability. Further, by reducing the size of the AF frame, the position of the ranging point (AF frame) can be more finely adjusted, and operability can be improved.

Also, although an example in which the configuration for changing the size of the AF frame is combined with the second example has been described, the configuration may be combined with the first example. By doing so, unintended changes in the movement ratio may occur during the touch-move. However, since the user can easily understand not only the current movement ratio but also the current pressing force Fs, erroneous operation can be inhibited and operability can be improved. Also, although an example in which the size of the AF frame is reduced in accordance with the increase in the pressing force Fs has been described, the size of AF frame (the ratio of the movement amount D of the AF frame with respect to the touch-move movement amount Fm) may be increased in accordance with the increase in the pressing force Fs.

While the present invention has been described in detail on the basis of the preferred embodiments as described above, the present invention is not limited to these specific embodiments, and various forms without departing from the gist of the present invention are also included in the present invention. Further, each of the embodiments described above merely indicates one embodiment of the present invention, and the embodiments can be appropriately combined with each other.

Also, the various controls described as being performed by the system controller 50 may be performed by one piece of hardware, and a plurality pieces of hardware (for example, a plurality of processors and circuits) may share the processing to control the entire device. Also, although the case in which the present invention is applied to the digital camera (imaging device) has been described as an example in the embodiments described above, the present invention is not limited to this example, and is applicable to any electronic device that can detect a moving operation of touching and moving an operating body on an operation surface. For example, the present invention is applicable to personal computers, personal digital assistants (PDAs), mobile phone terminals, portable image viewers, printers, digital photo frames, music players, game machine, electronic book readers, video players, and the like. Moreover, the present invention is also applicable to display devices (including projection devices), tablet terminals, smartphones, AI speakers, home appliances, on-vehicle devices, medical equipment, and the like.

According to the present disclosure, a user can change a movement amount of an item with good operability.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-108824, filed on Jun. 11, 2019, which is hereby incorporated by reference herein in its entirety.

What is claimed is:
1. An electronic device comprising:
a first detector configured to detect a moving operation of moving an operating object while touching an operation surface with the operating object;
a second detector configured to detect a pressing force of the operating object on the operation surface; and
at least one memory and at least one processor which function as a control unit configured to control so that
in a case where the moving operation detected by the first detector is in a first length and the pressing force detected by the second detector is in a first magnitude, an item displayed on a display is moved in a first distance; and
in a case where the moving operation detected by the first detector is in the first length and the pressing force detected by the second detector is in a second magnitude that is different from the first magnitude, the item displayed on the display is moved in a second distance that is longer than the first distance, wherein
the control unit determines a correspondence correlation between the movement amount of the operating object and the movement amount of the item at the start of the moving operation, and, even if the pressing force changes, keeps the correspondence correlation between the movement amount of the operating object and the movement amount of the item until completion of the moving operation.
2. The electronic device according to claim 1, wherein, in accordance with an increase in the pressing force, the control unit decreases a movement amount of the item displayed on the display in a case where the moving operation detected by the first detector is in the same length.

3. The electronic device according to claim 1, wherein the control unit further controls so that
in a case where the moving operation detected by the first detector is in the first length and the pressing force detected by the second detector is in the first magnitude, a color of the item displayed on the display is changed to a first color; and
in a case where the moving operation detected by the first detector is in the first length and the pressing force detected by the second detector is in the second magnitude, the color of the item displayed on the display is changed to a second color that is different from the first color.

4. The electronic device according to claim 1, wherein, in accordance with a continuous change in the pressing force, the control unit changes the movement amount of the item displayed on the display stepwise in a case where the moving operation detected by the first detector is in the same length.

5. An electronic device comprising:
a first detector configured to detect a moving operation of moving an operating object while touching an operation surface with the operating object;
a second detector configured to detect a pressing force of the operating object on the operation surface; and
at least one memory and at least one processor which function as a control unit configured to control so that
in a case where the moving operation detected by the first detector is in a first length and the pressing force detected by the second detector is in a first magnitude, an item displayed on a display is moved in a first distance; and
in a case where the moving operation detected by the first detector is in the first length and the pressing force detected by the second detector is in a second magnitude that is different from the first magnitude, the item displayed on the display is moved in a second distance that is longer than the first distance, wherein
during the moving operation, the control unit does not execute a predetermined function in response to a pressing on the operation surface with the pressing force greater than a threshold.

6. The electronic device according to claim 5, wherein the predetermined function is a function of fixing a position of the item.

7. The electronic device according to claim 1, wherein the control unit further controls so that
in a case where the moving operation detected by the first detector is in the first length and the pressing force detected by the second detector is in the first magnitude, a size of the item displayed on the display is changed to a first size; and
in a case where the moving operation detected by the first detector is in the first length and the pressing force detected by the second detector is in the second magnitude, the size of the item displayed on the display is changed to a second size that is different from the first size.

8. The electronic device according to claim 7, wherein, the control unit controls so that in accordance with an increase in the pressing force, the item displayed on the display be smaller in a case in which the moving operation detected by the first detector is in the same length.

9. The electronic device according to claim 1, wherein the item is an item indicating an AF position.

10. The electronic device according to claim 1, wherein the control unit controls so that an AF process corresponding to a position at which the item is displayed is executed in response to an operation of releasing the operating object from the operation surface.

11. A control method of an electronic device, comprising:
a first detection step of detecting a moving operation of moving an operating object while touching an operation surface with the operating object;
a second detection step of detecting a pressing force of the operating object on the operation surface; and
a control step of controlling so that
in a case where the moving operation detected in the first detection step is in a first length and the pressing force detected in the second detection step is in a first magnitude, an item displayed on a display is moved in a first distance; and
in a case where the moving operation detected in the first detection step is in the first length and the pressing force detected in the second detection step is in a second magnitude that is different from the first magnitude, the item displayed on the display is moved in a second distance that is longer than the first distance, wherein
in the control step, it is determined a correspondence correlation between the movement amount of the operating object and the movement amount of the item at the start of the moving operation, and, even if the pressing force changes, the correspondence correlation between the movement amount of the operating object and the movement amount of the item is kept until completion of the moving operation.

12. A non-transitory computer readable medium that stores a program, wherein
the program causes a computer to execute a control method of an electronic device, and
the control method includes:
a first detection step of detecting a moving operation of moving an operating object while touching an operation surface with the operating object;
a second detection step of detecting a pressing force of the operating object on the operation surface; and
a control step of controlling so that
in a case where the moving operation detected in the first detection step is in a first length and the pressing force detected in the second detection step is in a first magnitude, an item displayed on a display is moved in a first distance; and
in a case where the moving operation detected in the first detection step is in the first length and the pressing force detected in the second detection step is in a second magnitude that is different from the first magnitude, the item displayed on the display is moved in a second distance that is longer than the first distance, wherein
in the control step, it is determined a correspondence correlation between the movement amount of the operating object and the movement amount of the item at the start of the moving operation, and, even if the pressing force changes, the correspondence correlation between the movement amount of the operating object and the movement amount of the item is kept until completion of the moving operation.

* * * * *